June 2, 1942. J. A. J. BENNETT 2,284,717
AIRCRAFT SUSTAINING ROTOR
Filed April 26, 1939 2 Sheets-Sheet 1
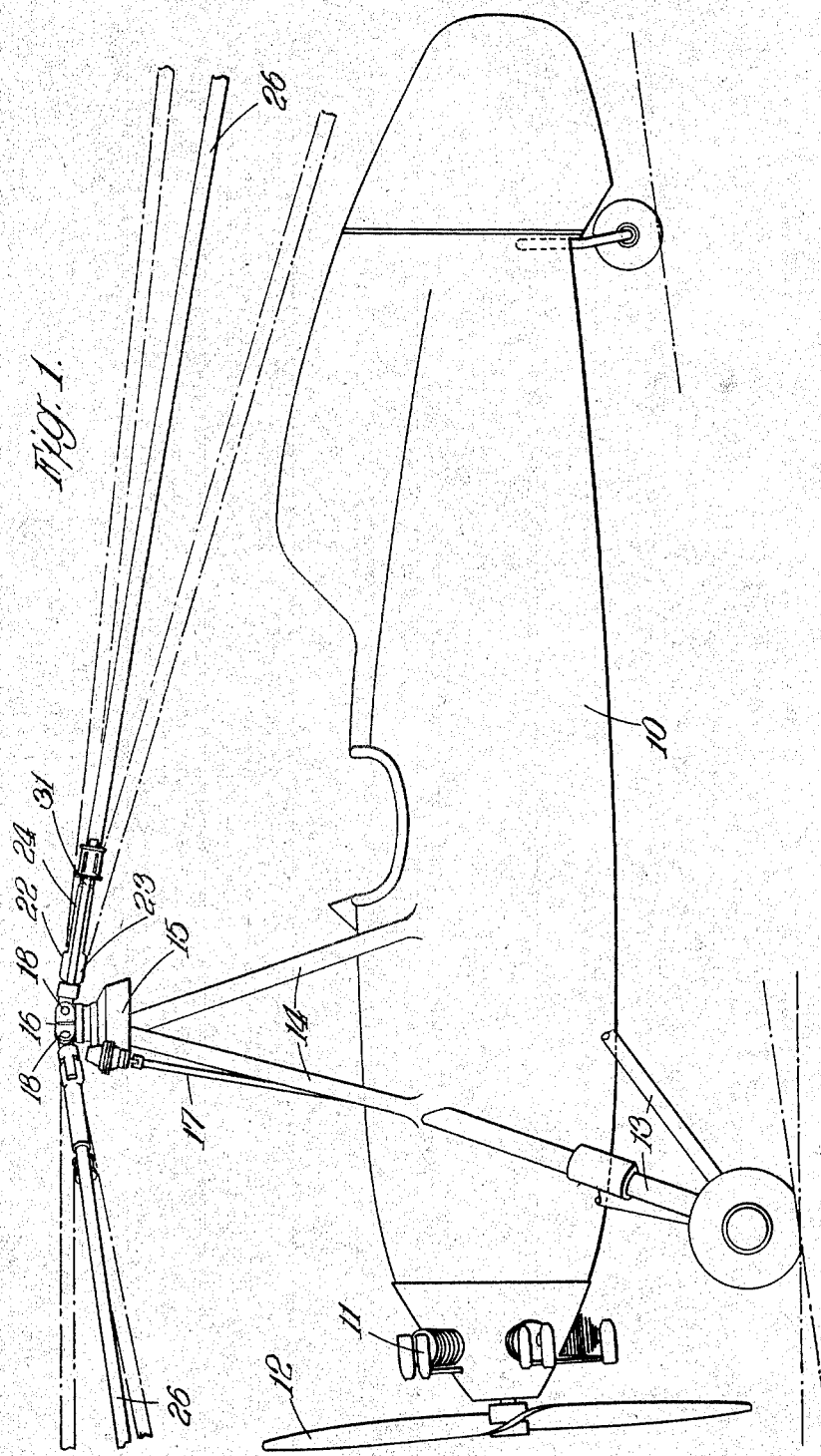
INVENTOR
James Allan Jamieson Bennett
ATTORNEYS
Synnestvedt + Lechner

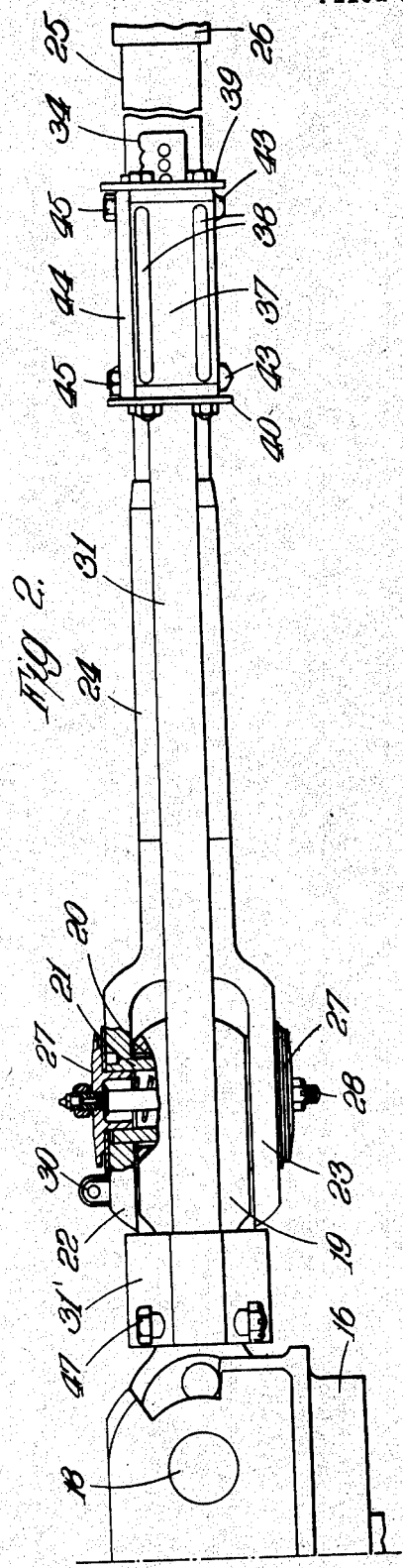

Patented June 2, 1942

2,284,717

UNITED STATES PATENT OFFICE 2,284,717

AIRCRAFT SUSTAINING ROTOR

James Allan Jamieson Bennett, Esher, England, assignor to Autogiro Company of America, Philadelphia, Pa., a corporation of Delaware Application April 26, 1939, Serial No. 270,218
In Great Britain April 28, 1938

5 Claims. (Cl. 244—18)

This invention relates to sustaining rotors for gyroplanes or helicopters of the kind in which the blades are capable of at least limited leading and lagging displacement with respect to the hub; the blades may also be capable of the usual flapping motion but the present invention is not primarily concerned with flapping.

It has already been proposed in a freely rotative hinged wing system or sustaining rotor having freely flapping blades or wings to make the wings either inherently resilient or to join them by hinges to their common supporting member in such a manner that the wings are permitted a restricted displacement relatively to one another in the plane of rotation with yieldable connections between the wings tending during rotation to maintain them in symmetrical relation.

It has however hitherto been the usual practice at least in gyroplanes to connect the rotor blades to their supporting members (usually consisting of "drag links" articulated to the hub for flapping) by means of pivots allowing the blades to swing freely in the leading and lagging direction relative to the hub and to damp the movements of the blades relative to the hub, about the drag pivots by means of frictional dampers.

It has been found that the frictional restraint afforded by dampers may conveniently be replaced by a resilient restraint if properly constructed and arranged in accordance with the present invention.

It is now known that interblade connections tending to maintain symmetry in the plane of rotation are not only unnecessary but may be disadvantageous. It would therefore appear that the requisite restraint on leading and lagging displacements of the blades could be obtained by suppressing the drag pivots altogether and by making the root member of the blades sufficiently flexible in the leading and lagging plane to provide for a leading and lagging displacement of the blade relatively to the hub taking place under the required amount of resilient restraint.

The construction of a flexible blade root of this kind having the appropriate resilience to impose the required amount of restraint on the leading and lagging oscillation of the blade, and to give said oscillation such a natural frequency that there would be no danger of resonance with the forced vibrations encountered in flight, and having at the same time adequate strength to resist the centrifugal loading during rotation, would not present any serious difficulty, but such a flexible root structure would have inadequate stiffness in torsion unless otherwise reinforced for this purpose.

The present invention therefore in essence consists in the provision, in combination, of a pivotal articulation (drag pivot) permitting unrestricted leading and lagging of the blade, but strongly resistant to twisting in any plane containing its axis, and a resilient connection resistant to leading and lagging displacement of the blade. Although the resilient connection of the present invention contemplates preferably the elimination of the ordinary friction damper for the drag pivot, the measure of resiliency of the connection may conveniently be defined in terms of comparison with the well-known friction damper installation. Thus, the resilience of the connection is preferably so selected or adjusted that the maximum restoring moment exercised thereby on the blade about the drag pivot axis in the course of the leading and lagging oscillation in normal flight is substantially equivalent to the moment which would be required to overcome the limiting frictional resistance of a frictional damper of the usual kind when appropriately adjusted, and with the resilient connection so designed or adjusted, the natural frequency of the leading-lagging oscillation is such that resonance with the forced vibrations does not occur.

The resilient connection may, if desired, be so disposed and anchored, and of sufficient strength and stiffness in tension, that it can transmit the centrifugal force of the blade to the hub and thereby relieve the drag pivot of centrifugal loading.

Means are preferably provided for adjusting the resilience of the connection restraining displacement about the drag pivot without dismantling the whole assembly of the blade root, and a convenient form of device for this purpose is provided in the specific example hereinafter described with reference to the accompanying drawings.

It is to be understood that the references to drag pivots are not to be read as limited to pure drag pivots, i. e., pivots on which the blade movement is purely one of lead and lag, but as including any pivot or complex pivotal articulation about which the blade movement is principally one of lead and lag; thus the drag pivot may be inclined either in the plane containing the axis of rotation of the hub and the axis of the blade so that the leading and lagging displacement is accompanied by variation of pitch angle, or may be inclined in a plane perpendicular to the axis of the blade, so that leading and lagging movement is accompanied by flapping (which may be compensated by displacement about the usual flapping pivot). It must be understood however that if the blade articulation includes a flapping pivot as well as a drag pivot (as above broadly defined), and if it be desired to retain full freedom of movement about the flapping pivot, the resilient means restraining movement about the drag pivot must be so disposed and connected that movement upon the flapping pivot is in no way restrained. This will be the case if a drag link is connected to the hub by means of a flapping pivot and to the blade by means of a drag pivot and the resilient connection is effective between the drag link and the blade. Alternatively the blade may be connected by means of a flapping pivot to a link or trunnion block which is connected to the hub by means of a drag pivot and the resilient connection may be mounted so as to be effective between the hub and the link or trunnion block.

The combination of a drag pivot and a resilient restraint as herein described affords a blade attachment giving the required restraint of leading and lagging displacement and having adequate torsional stiffness and strength to resist centrifugal force.

The accompanying drawings illustrate by way of example a preferred constructional embodiment of this invention as applied to a blade root assembly for the rotor of a gyroplane or helicopter in which a drag link is connected to the rotor hub by means of a flapping pivot and the rotor blade is connected to the drag link by combined pivotal and resilient connections as hereinbefore set forth.

The following description has reference to the accompanying drawings, in which:

Fig. 1 is a view in side elevation of a gyroplane embodying the present invention;

Fig. 2 is a view in side elevation partly in section showing the connections of one of the rotor blades to the rotor hub;

Fig. 3 is a plan view of the same.

The gyroplane of Fig. 1 comprises the usual body 10, engine 11, airscrew 12 and undercarriage 13. A pyramidal pylon structure 14 of the usual kind supports a rotor head assembly 15 in which the rotor hub 16 is rotatably mounted in bearings (not shown). The rotor head assembly 15 also includes rotor driving gear of the usual kind, the drive being taken from a transmission shaft 17 which is connected to the engine 11 in the known manner through gearing and a clutch, these parts being contained within the body 10 and not shown on the drawings.

In the example shown, a three-bladed rotor is provided, two of the blades 26 being shown in Fig. 1.

Referring more particularly to Figs. 2 and 3, the rotor hub 16 terminates upwardly in a forked structure carrying flapping pivot pins 18 of which one is shown in Figs. 2 and 3. A drag link 19 articulates for flapping on the flapping pivot pin 18 and its outer end is bored at right angles to the axis of the flapping pivot to receive a bush 20 in which a drag pivot pin 21 is rotatable. The ends of the latter are secured in the upper and lower members 22, 23 of a forked structure constituting the inner end of a blade root socket 24 in which is secured the root end of a blade spar 25 carrying the rotor blade 26. The drag pivot assembly is completed by cover plates 27 secured by a central through-bolt 28. The upper member 22 of the fork end of the blade socket 24 is provided with a slot 29 in which engages a pin 30 secured in the drag link 19 to limit movement upon the drag pivot; the pin 30 is made easily removable to permit folding of the rotor blades.

The root end of the blade spar 25 is further connected to the drag link 19 by means of a resilient connection consisting of a straight metal tube 31 whose inner end is anchored by means of a through-bolt 47 in the larger half 31' of a split clamp 31', 32 which is secured on the shank of the drag link by means of clamping bolts 46. The outer end of the tube 31 is provided with an adjustable collar 33. To locate the collar 33 on the tube 31 the inner surface of the collar 33 is suitably shaped to engage one or other of a series of notches 34 formed in the outer surface of the tube 31 and the collar is further secured by means of a set screw 36 engaging in one or other of a series of tapped holes 35 in the tube 31. This arrangement provides a convenient means by which the position of the collar 33 along the length of the tube 31 may be adjusted. The outer surface of the collar 33 is machined to a spherical form and engages between two vertical plates 37 secured by means of bolts 38 to a pair of transmission flanges 39 welded or otherwise secured to one half 41 of a split clamp 41, 42 which is clamped about the root end of the blade spar 25 by means of bolts 43. The plates 37 are further rigidly secured in correct parallel spacing by means of a cover plate 44 attached to the plates 37 by means of studs 45.

Since the resilience, i. e., the restoring force for a given deflection, of the tubular connection 31 depends on the length between its abutments it will be seen that by adjustment along the length of the tube 31 of the collar 33 which abuts against the plates 37, the effective length of the spring constituted by the tube 31 can be easily regulated. It will also be seen that the spherical external shape of the collar 33 effectively prevents binding between the plates 37 so that the tube 31 acts in the same manner as a leaf spring encastre at one end and free at the other. It will of course be recognised that if the tube 31 were effectively encastre at its outer end as well as at its inner end its effective stiffness would be approximately quadrupled. The location of the collar 33 between the plates 37 further allows of some longitudinal sliding when the rotor blade 26 leads or lags about the drag pivot 20, 21 and it will be seen that if such sliding were not provided for the tube 31 would be stressed not only as a beam but alternately as a strut or tension member and additional stresses would be thrown on the clamping assembly 42, 43, etc., and thereby on the blade spar 25.

It has already been explained that the maximum restoring moment on the tube 31 in normal flying conditions should be approximately equal to the moment required to overcome the static friction of a friction damper as usually applied to a drag pivot when correctly adjusted for the rotor in question and the length and stiffness of the tube 31 are therefore selected accordingly; final adjustment of the effective resilience of the connection constituted by the tube 31 is effected by adjusting the position of the collar 33.

In the arrangement illustrated in the drawings and described above the centrifugal force of the blade is entirely transmitted by the drag pivot 20, 21 since the nature of the joint between the collar 33 and the plate 37 effectively relieves the tube 31 of tensile loading. If, however, it is desired to utilise the tensile strength of the tube 31 for relieving the drag pivot 20, 21 of centrifugal loading a different form of anchorage at the outer end of the tube 31 will be necessary and it will be recognised that if the tube 31 is anchored at both ends in such a manner as to be capable of sustaining tensile loads it will necessarily be encastre at both ends and the consequential increase of its effective stiffness will have to be taken into account. However, if both ends of the tube 31 are encastre some end play in the connection of the blade spar 25 to its socket 24 will be necessary, in order to ensure that movement of the blade on the drag pivot will be restrained only by bending of the tube 31 and to prevent the drag pivot from being subjected to severe alternate loading.

It must be understood that there is nothing in the detail of construction of the blade root structure and connections illustrated in Figs. 2 and 3 which is necessarily peculiar to the embodiment in a gyroplane as shown in Fig. 1 which is given merely by way of example. The structure and connections shown in Figs. 2 and 3 can be applied equally to a helicopter.

What I claim is:

1. In an aircraft sustaining rotor comprising a hub and a blade, mechanism connecting the blade to the hub including a pivotal articulation whose axis intersects the general plane of rotation in a position to accommodate leading and lagging movement of the blade relative to the hub and which is resistant to twisting in planes containing its axis, and a resilient device resistant to displacement of the blade about said pivotal articulation, said device comprising an elongated resilient member having its ends operatively associated respectively with an element of the blade and an element of said connecting mechanism, one of said ends being fixedly secured to its associated element and the other end being in sliding cooperation with its associated element, and means whereby the distance between the point of fixation and the point of sliding cooperation may be varied to change the natural frequency of said member.

2. In an aircraft sustaining rotor comprising a hub and a blade, mechanism mounting the blade on the hub including a pivotal articulation whose axis intersects the general plane of rotation in a position to accommodate leading and lagging movement of the blade relative to the hub and which is resistant to twisting in planes containing its axis, and a resilient device resistant to displacement of the blade about said pivotal articulation, said device comprising an elongated resilient cantilever restraining member having its ends operatively associated respectively with an element of the blade and an element of said mounting mechanism, one end being fixedly secured to the latter element at a point inboard of the pivot, and the other end having means for contacting the blade which is adjustable to different positions lengthwise of said member to alter the position of application of forces whereby the natural frequency of oscillation is adjustable to be out of phase with the normal rotational frequency of the rotor.

3. In an aircraft rotor having a hub and an airfoil blade rotatable about the hub axis, blade mounting mechanism comprising a flight pivot providing for displacement movements of the blade in a sense involving swinging of the longitudinal blade axis to both sides of a predetermined normal, an elongated resilient member associated with an element of the blade and with an element of the mounting in position to be subjected only to lateral deflection by blade movement on said pivot, said member being of substantially fixed effective length between its points of reaction during operation, and abutment means determining said points of reaction at a spacing effective to oppose blade oscillation resonant with rotor r.p.m.

4. A construction according to claim 3 wherein one of said abutment means rigidly fixes one end of said member to one of said elements, and the other abutment means has relative longitudinal sliding engagement with the other element upon blade displacement at each side of the predetermined normal.

5. A construction according to claim 3 wherein one of said abutment means has a device for adjusting it to various fixed positions along the length of said member to alter the fixed effective length thereof.

JAMES ALLAN JAMIESON BENNETT.